Nov. 26, 1946. P. E. HAWKINS 2,411,570
STEERING GEAR FOR VEHICLES
Filed Nov. 27, 1943 3 Sheets-Sheet 1
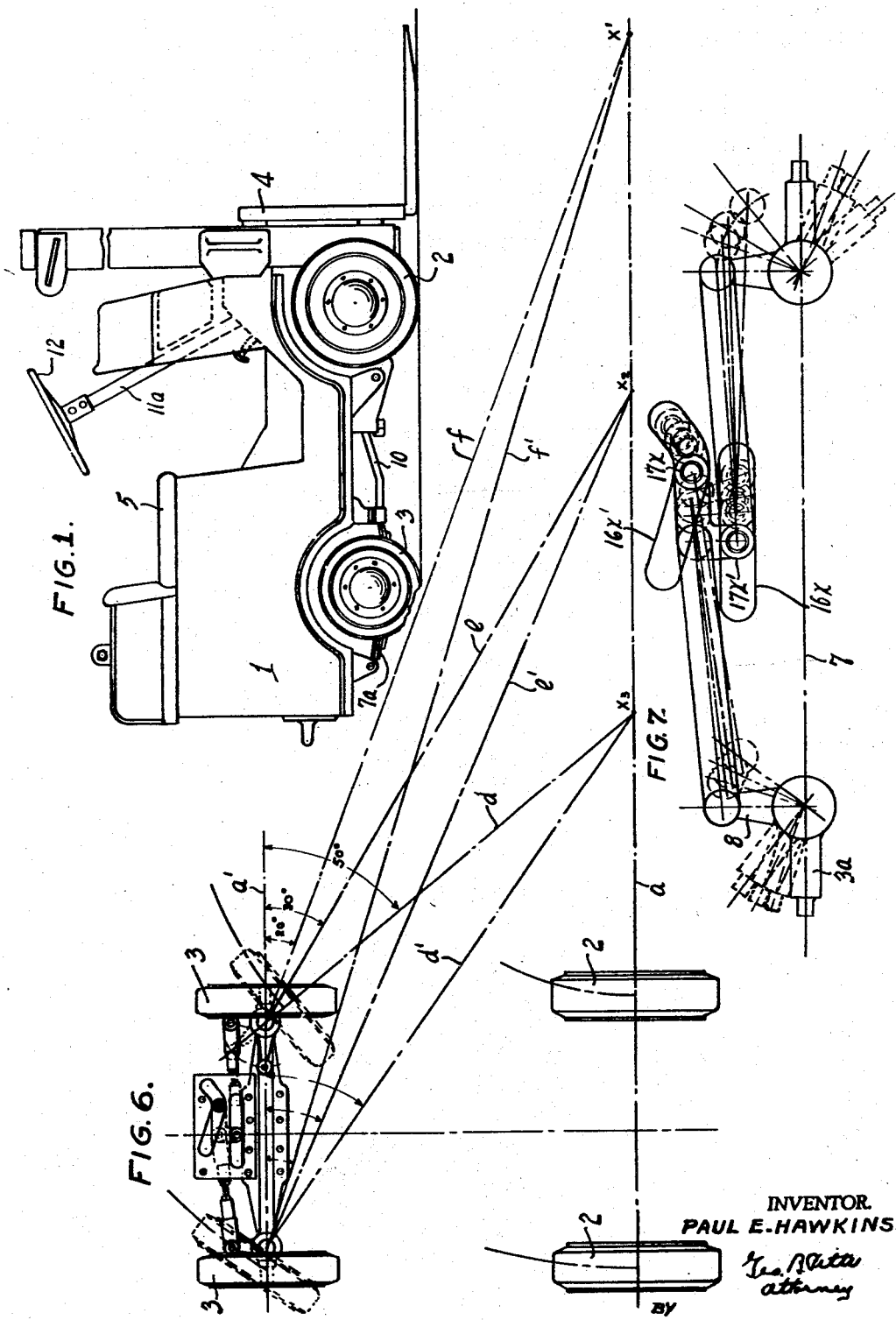
INVENTOR.
PAUL E. HAWKINS.

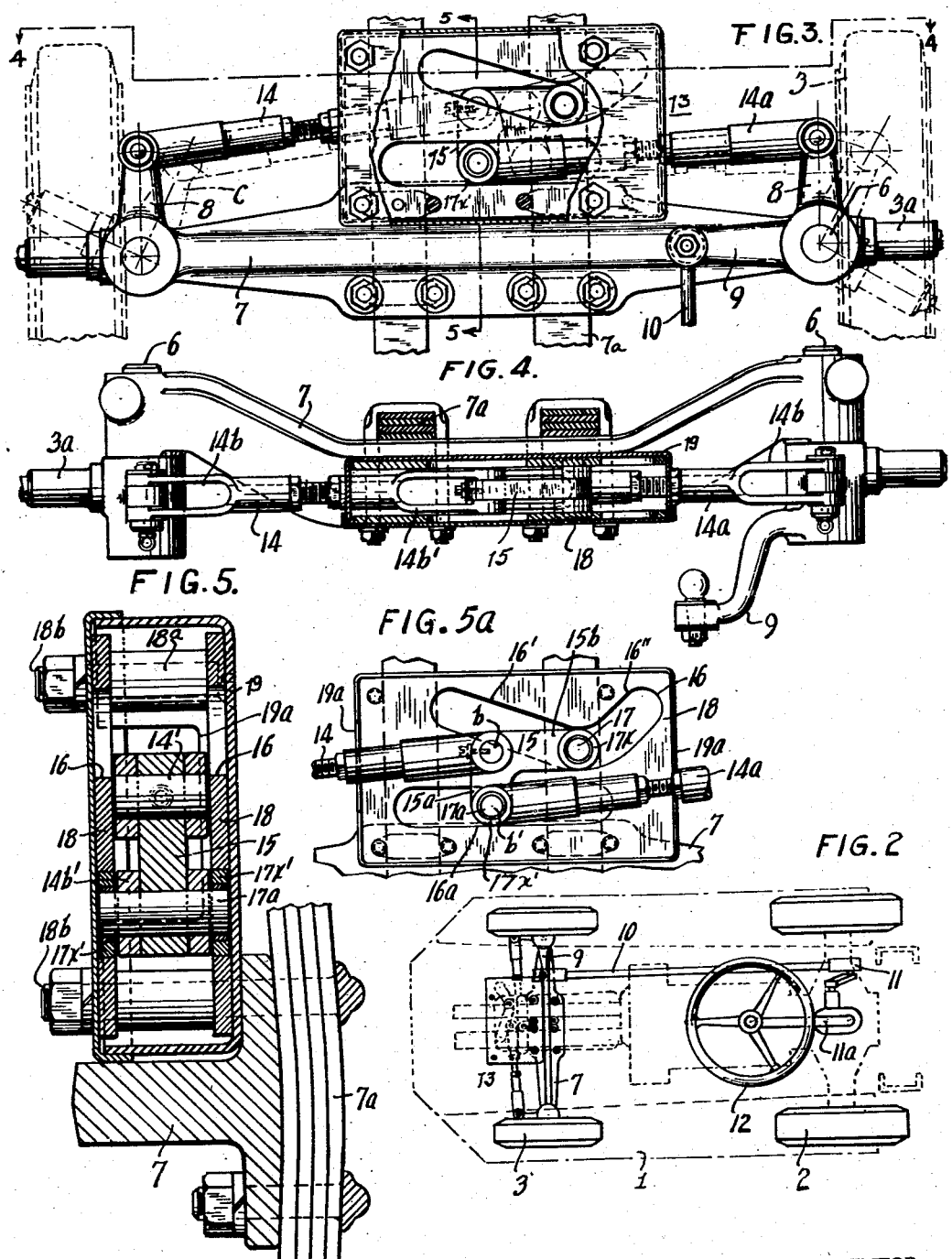

Nov. 26, 1946.   P. E. HAWKINS   2,411,570
STEERING GEAR FOR VEHICLES
Filed Nov. 27, 1943   3 Sheets-Sheet 3

INVENTOR.
PAUL E. HAWKINS.

Patented Nov. 26, 1946

2,411,570

UNITED STATES PATENT OFFICE 2,411,570

STEERING GEAR FOR VEHICLES

Paul E. Hawkins, Lakewood, Ohio, assignor to The Baker-Raulang Company, Cleveland, Ohio, a corporation of Ohio Application November 27, 1943, Serial No. 511,997

12 Claims. (Cl. 280—87)

This invention relates to wheel-mounted vehicles, more particularly to the steering gear mechanism therefor. The invention is particularly applicable to motor driven vehicles, although it is not to be limited to vehicles having a motor and powered thereby.

In all vehicles employing a pair of dirigible wheels to effect steering thereof, of which I have knowledge, operation of the vehicle along curvilinear paths has caused slippage between the treads of the tires (whether of the solid, cushion or pneumatic type) and the pavement or road in directions laterally of or at angles to the plane of each wheel, such slippage resulting in wear on the tire treads, stresses on the wheel mountings as well as wear of the pavement or road; and obviously these disadvantageous conditions are increased in proportion to the weight of the vehicle and its load. This wear takes place to a greater extent on the tires for the dirigible wheels as compared to the non-dirigible wheels of the vehicle, for which reason it is customary to shift the tires on the wheels. Also, greater wear takes place on the tires of vehicles having shortened wheel bases and/or narrowed treads as compared to tires on vehicles having long bases and/or wide treads.

While such wear may be reduced to a limited extent by maintaining perfect alinement of the wheels and adequate pressure in the tires (if pneumatic tires are used), such wear is always present due to the fact that when the dirigible wheels are operated about their respective trunnions or steering knuckles, they as well as the other supporting wheels for the vehicle do not traverse paths concentric to a common center.

One object of the invention is to provide an improved steering mechanism for a wheel mounted vehicle wherein wear on the wheel tires due to slippage thereof in steering the vehicle is eliminated.

Another object of the invention is to provide in a vehicle having dirigible supporting wheels improved connections between them for simultaneously swinging the wheels about their respective knuckles into different angular relation, whereby the wheels traverse paths about a common center to effect steering of the vehicle.

Another object of the invention is to provide in a vehicle having one or more non-dirigible supporting wheels and a pair of dirigible supporting wheels, improved connections between the latter wheels for simultaneously swinging them about their respective knuckles into different angular relation, whereby the dirigible wheels traverse paths about a common center during turning movements of the vehicle.

Another object of the invention is to provide in a vehicle having a pair of dirigible supporting wheels, improved connections between these wheels having an automatic compensating or differential mechanism operable to position the dirigible wheels in different angular relation for steering the vehicle whereby in each steering position these wheels traverse paths about a common center.

Another object of the invention is to provide in a vehicle having a pair of dirigible supporting wheels, improved connections between the dirigible mounted wheels and related to the axis of the non-dirigible wheel or wheels, operable in any steering position of the dirigible wheels to effect traverse of all of the supporting wheels about a common center.

Another object of the invention is to provide in a vehicle having at each end thereof a pair of dirigible mounted wheels, improved connections between each pair of wheels operatively connected to simultaneously swing all of the wheels and arranged to effect differential movement of the wheels of each pair, whereby all of the wheels in each steering position thereof traverse paths about a common center.

Other objects of the invention will be apparent to those skilled in the art to which my invention relates from the following description taken in connection with the accompanying drawings, wherein Fig. 1 is a side elevation of a vehicle embodying my invention.

Fig. 2 is a plan view showing the wheels for the vehicle and steering gear.

Fig. 3 is a fragmentary view of the steering gear, enlarged.

Figs. 4 and 5 are sections on the lines 4—4 and 5—5, respectively, of Fig. 3.

Fig. 5a is a fragmentary plan view of parts shown in Figs. 2 to 5, inclusive.

Figs. 6 and 7 are diagrammatic views illustrating the method of relating the steering connections to the steerable wheels; Fig. 6 also showing in dotted lines one steering position of the steerable wheels.

Figure 8:
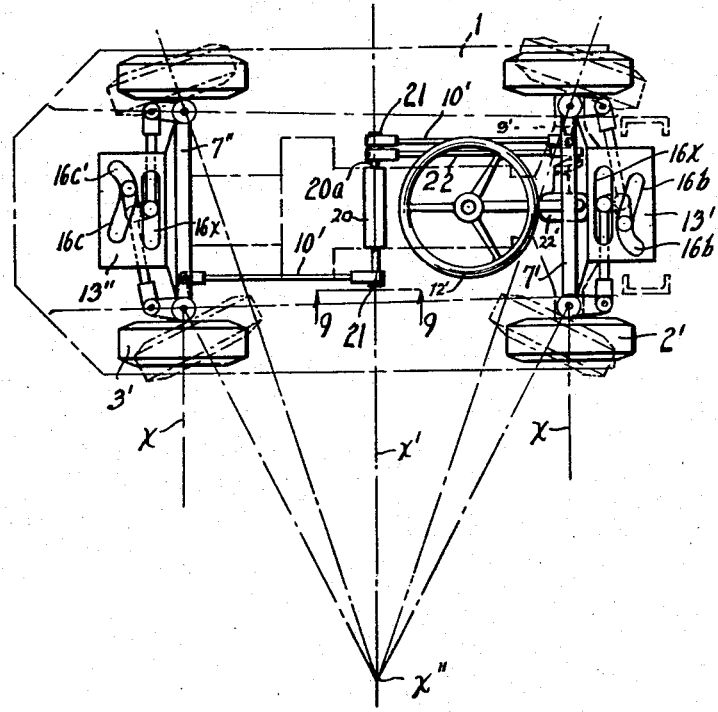

Fig. 8 is a plan view (partly diagrammatic) showing a modification wherein all four wheels of the vehicle are steerable.

Figure 9:
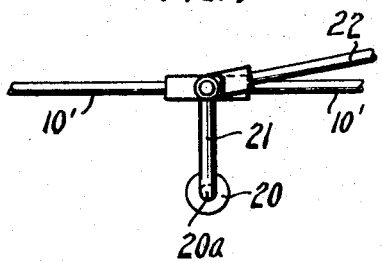

Fig. 9 is a section on the line 9—9 of Fig. 8

In the drawings, 1 indicates as an entirety a vehicle embodying a steering gear as hereinafter set forth. The vehicle 1 shown for illustrative purposes is of the industrial type having a pair of power driven wheels 2, dirigible steering wheels 3 and a suitable elevating mechanism 4. In the arrangement shown the wheels 2, adjacent the elevating mechanism 4 are non-steerable and power driven and the driver's station 5 is also adjacent to and faces the elevating mechanism 4, so that the wheels 2 may be referred to as the front wheels and the wheels 3 may be referred to as the rear wheels. It is to be observed that in industrial trucks it is the practice to provide dirigible steering wheels at either end of the truck irrespective of whether it embodies an elevating mechanism and also to position the driver's station remotely from the elevating mechanism or what may be termed the front end of the truck. Since the improved steering gear herein disclosed is applicable to all wheel mounted vehicles and vehicles having front or rear steerable wheels, such disclosure is merely illustrative of the preferred application of the invention.

The wheels 3 are mounted on suitable spindles 3a, having knuckles pivoted on pins 6 mounted in the opposite ends of the axle 7 and integrally connected steering arms 8 preferably extending forwardly from the axle 7. The axle 7 is connected in a well known manner to the vehicle frame by springs 7a. One spindle knuckle is provided with an arm 9, the outer end of which is connected by a rod 10 to a suitable gearing 11, the latter in turn being connected through the steering column 11a to an operating member, preferably consisting of a wheel 12, whereby the arm 9 may be operated to effect steering, as later set forth.

13 indicates as an entirety a differential or compensating mechanism connected to the arms 8 and arranged, upon operation of the wheel 12 during vehicle travel, simultaneously to swing the wheels 3 in either direction into different relative positions, whereby the wheels 3 traverse arcuate paths about a common center, which center in any operated position of the wheels is intersected by an imaginary line $a$ extending parallel to the normal axis of the wheels 3, shown at $a'$ (Fig. 6). By preference, the mechanism 13 is related to the axis of the wheels 2, as later set forth, that is the imaginary line $a$ is co-incident with the axis about which the wheels 2 rotate. Accordingly, in any turning movement of the vehicle, due to operation of the wheel 12, all four wheels 2, 3, will traverse paths about a common center. Where the steerable wheels have a diameter larger or smaller than the diameter of the non-steerable wheels (as shown), this imaginary axis or line $a$ will be disposed in a plane perpendicular to but above or below the axis of the wheels 2; since the diameter of the wheels 3 is less than that of the wheels 2, the center of the arcuate paths traversed by the wheels 2 and 3 will lie on a line $a$ below the axis on which the wheels 2 rotate.

While the range of swinging movement of the wheels 3 about their respective pins 6 relative to the axis $a'$ (see Fig. 6) may vary, as it is customary in maneuvering turns to decrease or increase the turning radius and in bringing the vehicle into a forward or backward straight direction of travel, such variations in the steering operation will obviously move the common center for the wheels 2, 3, along the imaginary axis $a$, in one direction or the other, dependent on the direction of swinging movement of the wheels 3, so that during any right or left turning movement of the vehicle on a fixed or varying radii, the wheels 2, 3, will always traverse paths about a common center or centers which lie in the axis $a$.

The differential mechanism 13 comprises the following; 14, 14a, indicate a pair of links pivotally connected at their outer ends to the outer ends of the arms 8, a connector 15 pivotally connected to and arranged to float between the inner ends of the links and guides 16, 16a, for controlling the movement of the connector 15. The link 14 is pivotally connected on an axis $b$ at its inner end to the connector 15, whereas the inner end of the link 14a is pivotally connected on an axis $b'$ to the connector 15 at one side of the axis $b$ of the pivotal connection of the link 14 with the connector 15, the axes $b$, $b'$ preferably being in a plane parallel to the planes of the wheels 2, 3, when the latter are in normal position for vehicle travel in a straight line forward or backward, and the connector 15 is provided with a device 17 (preferably consisting of a stud shaft provided with a roller 17x) which is disposed laterally of the plane intersecting the axes $b$, $b'$, and has pivotal and slidable engagement with the opposed walls of the guide 16. By preference, the connector 15 consists of a bell-crank having a short arm 15a, which is disposed parallel to the wheels 3 when the latter are in normal position, and a long arm 15b preferably disposed at right angles to arm 15a, the link 14 being pivotally connected by a stud shaft 14' on the axis $b$ to the bell-crank at the angle between its arms 15a, 15b, so that the lever arm 15b forms, in effect, an extension of the link 14, and the lever arm 15a serves as a connection between links 14, 14a, whereby the power transmitted from the wheel 12 through the arm 9 and adjacent arm 8 to the link 14a will move the link 14 substantially endwise but differentially as later set forth. The outer end of the short lever arm 15a is provided with a device 17a (preferably a stud shaft provided with a roller 17x') slidably engaging the opposed walls of the guide 16a, which preferably consists of an elongated slot extending substantially parallel to the axle 7, formed in a plate 18, whereas the roller 17x on the device 17 on the outer end of the long arm 15b of the bell-crank 15 slides in the guide 16, which consists of a cam-shaped elongated slot formed in the plate 18.

Each of the links 14, 14a, is of sectional construction to provide for their adjustment in length endwise. The outer end of each link terminates in a yoke 14b to receive the outer end of the adjacent arm 8 and likewise the inner end of each link 14, 14a, terminates in a yoke 14b' which straddles the bell-crank 15 (see Figs. 4 and 5). I preferably provide two plates 18 spaced by sleeves 18a surrounding bolts 18b, which clamp the plates in rigid relation, both plates being formed with guide slots 16, 16a. In this arrangement, the device 17a on the end of the lever arm 15a is provided on the opposite sides thereof with rollers 17x' engaging the side walls of the slots 16a and the device 17 on the lever arm 15b is provided on the opposite sides thereof with rollers 17x engaging the side walls of the slot 16.

In the disclosed arrangement the plates 18 are disposed on the outer side of the axle 7; by preference the inner U-bolts (also designated 18b) which secure the springs 7a to the axle 7 are utilized to secure the plates together along their inner sides and to rigidly mount the plates on the axle 7. The plates 18 and parts therebetween are preferably enclosed in a suitable casing 19, which is also secured in position by the b its 18b, as shown in Figs. 3 and 5, the end walls of the casing being formed with openings or cut-aways 19a (see Fig. 5a) through which the links 14, 14a, extend to permit movement thereof.

In view of the fact that the rollers 17x, 17x', are mounted on vertical axes and provided with flat peripheries and the side walls of the guide slots 16, 16a, are flat, the bottom wall of the casing 19 is utilized to slidably support these rollers and inner ends of the links 14, 14a, during movement thereof.

As shown in Figs. 3 and 5a, the guide slots 16a for the lever arm 15a extend transversely of the vehicle, whereas the cam-shaped guide slots 16 for the lever arm 15b have opposite end portions 16', 16'', at either side of their mid or peak portion, the angle of the portion 16'' relative to the slots 16a being greater than that of the portion 16'. When the wheels 3 are in normal position for forward or backward rectilinear travel the roller 17x is at the peak positions of the cam slots, whereby it may move in either direction and the roller 17x' is disposed intermediate the ends of the slots 16a, whereby it may move in either direction. Accordingly, when operation of the wheel 12 to swing the wheels 3 in either direction takes place, for example, to the right, as indicated at C (Fig. 3), the rod 14a will transmit such operation through the bell-crank 15 to the rod 14, thereby bodily moving the bell-crank and endwise moving the link 14. During such movement of the bell-crank 15, the roller 17x' moves rectilinearly transversely of the vehicle in the guide slots 16a, whereas the roller 17x traverses the cam portion 16'' of the guide slot 16 in a direction outwardly and laterally (the pivotal connections between the links 14, 14a, and bell-crank 15 permitting movement of the latter relative to the links), the result being that a reducing differential movement of the link 14 relative to that of the link 14a is effected due to the inclination of the cam portion 16'' of the guide slot 16, and accordingly in any steering operation toward the right the range of movement of the left side wheel 3 will be less than that of the right side wheel 3. On the other hand, in any steering operation toward the left, the roller 17x traverses the guide slot cam portion 16', the angle of which relative to the guide slot is less than that of the cam portion 16'', so that the movement transmitted by the link 14a through the bell-crank 15 to the link 14, will effect an increasing differential movement to the latter link so that the range of movement of the left side wheel 3 will be greater than that of the right side wheel 3.

Fig. 6 diagrammatically shows the angular steering relation of the wheels 3, on the radii $d$, $d'$, struck from the center $x^3$ when the right side wheel 3 is disposed at an angle of 50 degrees relative to the axis $a'$, whereby the wheels 2, 3, traverse paths about this center; radii $e$, $e'$, struck from the center $x^2$, indicate the position of the wheels 3 when the right side wheel is swung to a 30 degree angle relative to the axis $a'$; and radii $f$, $f'$, struck from the center $x'$, indicate the position of the wheels 3 when the right side wheel 3 is swung to a 20 degree angle relative to the axis $a'$. Accordingly, it will be observed that when a steering operation takes place, the compensating or differential mechanism 13 serves to position the wheels 3 in such relation that they and the wheels 2 move along paths about a common center.

It will be observed that since the wheels 2, 3, always move in paths about a common center in each operated position of the wheels 3, slippage of the vehicle wheels relative to the pavement or road is eliminated and that therefore wear on the tires due to slippage of this character is avoided.

From the foregoing description it will be appreciated that the shape of the cam slot 16 to control the differential movement of the wheels 3, whereby in any and all operating positions for steering the vehicle laterally, they and the wheels 2 may traverse paths about a common center, depends on certain dimensions of the vehicle, such as its wheel base, the treads of its wheels, the length of the arms 8 and the angle thereof relative to the wheel spindles 3a and lengths of the bell-crank arms 15a, 15b', the distance between the axes of the pins 6, also the links 14, 14a, must be adjusted to the proper lengths. When these factors are known, the wheel spindles 3a, arms 8, links 14, 14a, the bell-crank 15, a slot 16x, the roller 17x' in the slot 16x as shown in Fig. 7, the roller 17x and a line (not shown) spaced from the axle 7 representing the axis $a$ of the wheels 2 are drawn or developed on a sheet of suitable material, these parts being shown in normal position (this position being illustrated in full lines in Fig. 7). With the parts shown in this relation, the position of the roller 17 is first plotted to indicate the peak position of the cam guide slot. Next, the arms 8 are moved to different positions (that is, plotted on the material as shown in dotted lines) to show the spindles 3a on radii common to a center on the line $a$ and the position of the roller 17x is then plotted on the material. This plotting process is repeated for successive positions of the spindles 3a (three positions being shown in Fig. 7) throughout the steering range for the wheels 3 at either side of the peak position. As the diameter of the roller 17x is shown, the cam slot 16x' may be plotted from the successive positions of the axis of the roller 17x.

It will be observed that the arm 9 may be connected to the spindle 3a of either wheel and that the differential mechanism may be positioned rearwardly of the axle 7.

It will be observed from the foregoing description that the cam slot 16 may be plotted from centers on any line parallel to the normal axis $a'$; accordingly, in a vehicle having one or a pair of rigid supporting wheels 2, if this line is forward or rearward of the axis $a$, only the wheels 3 will traverse paths about a common center during steering operations. By preference the cam slot 16 is plotted from the axis $a$, so that all of the wheels will traverse paths about a common center in the operation of the vehicle and since this plotting is on or relative to the axis $a$, one or a pair of non-steerable wheels may be provided at that end of the vehicle opposite to the steerable wheels.

Fig. 8 illustrates the application of my invention to a vehicle having four steerable wheels 2', 3', knuckle mounted on axles 7', 7'', respectively, as shown in Figs. 3 and 4. The spindle for one of the wheels 2' and the spindle for one of the wheels 3' are provided with arms 9' which are operatively connected, as later set forth.

13' indicates as an entirety, a differential steering mechanism between and connected to the wheels 2' and 13'' indicates as an entirety a differential steering mechanism between and connected to the wheels 3', each of these mechanisms being similar in construction and operation to the mechanism 13, already described, except the shape of the guides or cam slots 16b, 16c, and the arrangement thereof, for which reason a detail description of the mechanisms 13', 13'', will not be necessary to an understanding of the invention and its application to the simultaneous steering of four wheels. Due to the fact that in any steering position (a) the wheels 2' are swung in one direction and the wheels 3' are simultaneously swung in the opposite direction, the lateral portion 16b' of the cam slot 16b, which portion has the increased angular relation to the adjacent transverse guide slot 16x, is remotely related to the corresponding portion 16c' of the cam slot 16c and (b) the cam slots 16b, 16c, are plotted in the manner already set forth according to centers which, in this form of construction, lie in an imaginary plane between the normal axes x of the wheels 2', 3', as indicated by the line x'. Accordingly when the wheels 2', 3' are positioned as shown in dotted lines, they will traverse paths about the common center x'', and this will apply to a predetermined center in any steering position of the wheels 2', 3'.

It will be observed that the centers about which the wheels 2', 3', move lie on a line therebetween. Where this line is nearer one pair of wheels than the other pair, each cam slot 16b, 16c, must be separately plotted in the manner already set forth; however, where this line is disposed midway between the pair of wheels (that is, their axes), as shown in Fig. 8, the cam slots will be similar in shape except that their lateral portions will be reversely related for reasons above set forth; accordingly only one cam slot needs to be plotted on a chart or other material for one pair of wheels, as it is only necessary to turn the chart over for determining the shape of the cam slot for the other pair of wheels. The plotting is carried out similar to that already set forth, except that one pair of wheels only are successively related to centers on the plane or line x' midway between the wheels 2', 3'.

The connections between the arms 9' preferably consist of the following: 20 indicates a housing suitably supported on the vehicle chassis and providing an elongated bearing for a transverse rock shaft 20a the opposite ends of which are provided with cranks 21, which normally extend in the same direction relative to the shaft, preferably vertically upwardly. The outer end of each crank 21 is pivotally connected to the inner end of a rod 10', the outer end of which is pivotally connected to the adjacent arm 9'. The crank 21 at one side is also connected to a link 22 which is suitably connected through suitable mechanism in a casing 22' to a steering column 11a' having a wheel 12'.

To those skilled in the art to which my invention relates many changes in construction and widely differing embodiments and applications of the invention will be apparent without departing from the spirit and scope thereof. My disclosures and description herein are purely illustrative and not intended to be in any sense limiting.

What I claim is:

1. In a vehicle, comprising a frame and front and rear supporting wheels for the frame, the wheels at one end of said frame being mounted thereon to swing on substantially vertical axes to effect steering of the vehicle, means operatively connected to one of said swingable wheels for swinging it from normal position in either direction, and connections between the wheel connected to said swingable means and the other wheel for swinging the other wheel from normal position in either direction, whereby both wheels swing in the same direction when operated for steering the vehicle on curvilinear lines of travel, said connections including an intermediate connecting element operable to permit overlapping relative movement between other elements of said connections, and guides for the elements of said connections, said connections being thereby operable to automatically position said swingable wheels in angular relation in any operated position to effect vehicle travel on arcs about a common center.

2. A vehicle as claimed in claim 1 wherein the guides consist of a cam with which the elements of said connections slidably engage.

3. In a vehicle comprising a wheel mounted frame, the wheels at one end of said frame being mounted to swing on substantially vertical axes from normal position in either direction for steering the vehicle, manually operated means connected to one of the wheels and connections between them, said connections comprising a pair of transversely disposed links each pivotally connected at its outer end to one of said wheels, a separate link pivotally connected at its opposite ends to the inner ends of said links and operable to transmit the thrust or pull from one link to the other link to swing both wheels in the same direction when said manually operated means are operated, and means for controlling the movement of said separate link during operation of said manually operated means to permit relative movement between the ends of said links endwise thereof, one slower or faster than the other link dependent upon the operation of said wheels to either side of their normal position.

4. In a vehicle comprising a frame, a pair of spaced supporting, steerable wheels at each end of said frame, each wheel of each pair being mounted to swing on a substantially vertical axis, means connected to one of said wheels of each pair for operating it in either direction, operating connections between the wheels of each pair arranged to swing both of said wheels in the same direction when operated for steering the vehicle, said connections for each pair of wheels consisting of links pivotally connected at their outer ends to said wheels and connecting means between the inner ends of said links operable to move the latter endwise relative to each other during operation of said operating connections between said pair of wheels, whereby one wheel of each pair is caused to swing through a larger angle than that of the other wheel of the pair, and operating connections between one wheel of each pair of wheels and a wheel of the other pair of wheels arranged, in each steering operation, to simultaneously swing said pairs of wheels in opposite directions.

5. In a vehicle as claimed in claim 4 wherein is provided a cam having lateral portions predeterminately related to a vertical plane parallel to the normal axes of each pair of wheels for guiding one of the links connected to the adjacent pair of wheels during movement thereof, one wheel thereof relative to the other wheel of the pair, whereby said one link will swing one wheel at a greater angle.

6. In a vehicle comprising a frame, a pair of supporting wheels adjacent one end of said frame, an axle at the opposite end of said frame, a pair of dirigible supporting wheels mounted on the opposite ends of said axle, means connected to one of said dirigible wheels for operating it in either direction, arms fixedly related to the spindles for said dirigible wheels, and push and pull connections between and connected to said arms operable to swing both of said wheels in either direction, an intermediate element of said connections being movable relative to the elements thereof connected to said arms to control the movements of the last mentioned elements, one relatively faster or slower than the other wheel dependent upon the direction of swinging movement of said operated wheel.

7. In a vehicle comprising a frame, a pair of supporting wheels adjacent one end of said frame, an axle at the opposite end of said frame, a pair of dirigible supporting wheels mounted on the opposite ends of said axle, arms fixedly related to the spindles for said last mentioned wheels, and differential connections between said arms operable to swing both of said wheels in either direction one relatively faster or slower than the other wheel dependent upon the direction of swinging movement thereof, differential connections consisting of a plate fixed to said axle and provided with guides, links pivotally connected at their outer ends to said arms and each extending therefrom toward the other arm, a device on the inner end of one of said links slidably engaging one of said guides, a connector pivotally connected to the inner ends of said links, and a device on said connector spaced from its connection with the other link slidably engaging the other guide, the first mentioned guide extending transversely of said frame and the last mentioned guide having lateral portions disposed at different angles to said first mentioned guide, and means connected to one of said dirigible wheels for swinging said wheels in either direction.

8. A vehicle comprising a frame, a pair of supporting wheels adjacent each end of said frame, the wheels of one pair being dirigibly mounted on said frame in spaced relation, means connected to one of said dirigible wheels for operating it in either direction, and connections between said dirigible wheels and said frame operable to swing them together in either direction and simultaneously control the movement of one wheel faster or slower than the other wheel dependent upon the direction of swinging movement of said dirigible wheels, said connections consisting of a pair of relatively movable links pivotally connected at their outer ends to said dirigible wheels, an element between and pivotally connected to the inner ends of said links and means carried by said frame for guiding said element during movement of said links to control the relative movement thereof.

9. In a vehicle comprising a frame, a pair of supporting wheels adjacent one end of said frame, a pair of dirigible supporting wheels adjacent the opposite ends of said frame, connections between said dirigible wheels and said frame operable to swing said wheels together in either direction and simultaneously control the movement of one wheel faster or slower than the other wheel dependent upon the direction of swinging movement thereof, the connections between said dirigible wheels consisting of a plate mounted on said frame and provided with guides, a link pivotally connected at its outer end to each of said wheels, a device on the inner end of one of said links slidably engaging one of said guides, a bell crank, one arm of which is pivotally connected to said device, the inner end of the other link being pivotally connected to said bell crank intermediate its ends and the other arm of said bell crank being provided with a device slidably engaging the other guide, the last mentioned guide having lateral portions disposed at different angles relative to said first mentioned guide, and means connected to one of said dirigible wheels for swinging it in either direction.

10. In a vehicle, the combination with a frame and front and rear supporting wheels for said frame, the wheels at one end of said frame being mounted thereon to swing on substantially vertical axes, of means operatively connected to one of said swingable wheels for swinging it from normal position in either direction, connections between the wheel connected to said swinging means and the other swingable wheel for swinging the latter from normal position in either direction, whereby both swingable wheels swing in the same direction when operated for steering the vehicle on curvilinear lines of travel, said connections consisting of a pair of links disposed substantially transversely of the vehicle frame and each pivotally connected at its outer end to one of said swingable wheels and an intermediate link pivoted at its opposite ends to the inner ends of said first mentioned links, said intermediate link being provided with an arm forming an extension of one of said first mentioned links, and means for guiding the outer end of said arm laterally during thrust or pull on said first mentioned links through said intermediate element to effect relative movement between said first mentioned links, one of said links faster or slower than the other link dependent upon the direction in which said swingable wheels are operated, whereby said swingable wheels in any steering position are in different angular relation.

11. In a vehicle, the combination with a frame and front and rear supporting wheels for said frame, the wheels at one end of said frame being mounted thereon to swing on substantially vertical axes to effect steering of the vehicle, means operatively connected to one of said swingable wheels for swinging it from normal position in either direction, connections between the swingable wheel connected to said swinging means and the other swingable wheel for swinging the other wheel from normal position in either direction, whereby both swingable wheels swing in the same direction when operated for steering the vehicle on curvilinear lines of travel, said connections consisting of a pair of links disposed substantially transversely of said frame and each pivotally connected at its outer end to one of said swingable wheels and an intermediate link pivotally connected to the inner ends of said first mentioned links and arranged to transmit thrust or pull from one of said first mentioned links to the other first mentioned link, whereby both wheels swing in either direction when said swinging means are operated, said intermediate link being operable during swinging of said swingable wheels to permit relative movement between said first mentioned links, and means for controlling the movement of said intermediate link to effect slower or faster movement of one of said first mentioned links relative to the other first mentioned link, dependent upon the direction of swinging movement of said swingable wheels at either side of their normal position, whereby said wheels in any steering position are disposed in different angular relation relative to their normal position.

12. In a vehicle comprising a frame, dirigible supporting wheels disposed adjacent the opposite ends thereof, each wheel being mounted to swing on a substantially vertical axis to respectively different angular positions, connections between a wheel at one end of said frame and a wheel at the opposite end thereof for simultaneously swinging them in opposite directions, the wheels at one end of said frame being spaced, connections between said spaced wheels adapted to swing them in the same direction into steering positions, said last mentioned connections consisting of transversely arranged links pivotally connected at their outer ends to said spaced wheels and a link pivotally connected to the inner ends of said transversely arranged links and operable to permit said transversely arranged links to move endwise relative to each other, and operating means connected to said first mentioned connections arranged to swing said wheels to angular positions and to simultaneously swing all of the wheels to their respective angular positions.

PAUL E. HAWKINS.

Certificate of Correction

Patent No. 2,411,570.

November 26, 1946.

PAUL E. HAWKINS

It is hereby certified that error appears in the printed specification of the above numbered patent requiring correction as follows: Column 9, line 26, claim 7, before the word "differential" insert *said*; and that the said Letters Patent should be read with this correction therein that the same may conform to the record of the case in the Patent Office.

Signed and sealed this 25th day of February, A. D. 1947.

[SEAL]

LESLIE FRAZER,
*First Assistant Commissioner of Patents.*